United States Patent [19]

Meyer

[11] Patent Number: 5,661,589

[45] Date of Patent: Aug. 26, 1997

[54] BILATERAL SLIT ASSEMBLY, AND METHOD OF USE

[75] Inventor: Duane E. Meyer, Lincoln, Nebr.

[73] Assignee: J. A. Woollam Co. Inc., Lincoln, Nebr.

[21] Appl. No.: 399,093

[22] Filed: Feb. 24, 1995

[51] Int. Cl.$^6$ .................... G02F 1/28; G02B 5/00
[52] U.S. Cl. .................... 359/232; 356/329; 356/331; 356/332
[58] Field of Search .................... 359/227, 230, 359/894, 232; 356/329, 331, 225, 310, 300, 332, 333, 334; 250/550; 354/245, 246, 247

[56] References Cited

U.S. PATENT DOCUMENTS

| | | | |
|---|---|---|---|
| 1,746,083 | 2/1930 | Kurtz | 356/332 |
| 2,755,707 | 7/1956 | Meltzer | 359/232 |
| 2,914,987 | 12/1959 | Crosswhite, Jr. et al. | 356/334 |
| 2,964,998 | 12/1960 | Middlestadt | 356/310 |
| 3,211,056 | 10/1965 | Goldstein et al. | 356/334 |
| 3,537,777 | 11/1970 | Flynn | 359/232 |
| 3,645,630 | 2/1972 | Newcomer | 356/332 |
| 3,806,251 | 4/1974 | Dändliker et al. | 250/550 |
| 3,860,328 | 1/1975 | Firth | 359/232 |
| 3,937,580 | 2/1976 | Kasdan | 250/550 |
| 4,051,502 | 9/1977 | Mielke . | |
| 4,122,461 | 10/1978 | Morean et al. . | |
| 4,316,661 | 2/1982 | Saito . | |
| 4,320,950 | 3/1982 | Senuma et al. . | |
| 4,325,634 | 4/1982 | Tohyama | 356/332 |
| 5,206,765 | 4/1993 | Träger | 356/333 |

FOREIGN PATENT DOCUMENTS

| | | | |
|---|---|---|---|
| 2332825 | 1/1974 | Germany | 359/232 |
| 2828342 | 1/1980 | Germany | 359/232 |
| 57-52830 | 3/1982 | Japan | 356/332 |
| 58-108427 | 6/1983 | Japan | 359/232 |
| 1-86027 | 3/1989 | Japan | 356/329 |
| 808868 | 2/1981 | U.S.S.R. | 359/232 |
| 0830138 | 5/1981 | U.S.S.R. | 356/331 |
| 1188543 | 10/1985 | U.S.S.R. | 359/894 |
| 1213355 | 3/1986 | U.S.S.R. | 356/300 |
| 1434276 | 10/1988 | U.S.S.R. | 356/334 |
| 1583754 | 8/1990 | U.S.S.R. | 356/329 |
| WO80/0000189 | 2/1980 | WIPO | 356/329 |

OTHER PUBLICATIONS

"Ratio—Recording System for Absorption Cell", *JOSA*, vol. 47, No. 5, p. 371 May 1957.

A.T. Collins, "A Spectrometer Slit–Servo, Using a D.C. Stepper Motor", J. Physics E, vol. 8, No. 12, p. 1021–1023, Bristol England, Dec. 1975.

G. Fassin, "A New Type of Sectrographic Slit" J.O.S.A, vol. 23, pp. 186–188, May 1933.

Diffraction Grating Handbook, C. Palmer, E. Loewen Editors, Milton Roy Co., 1994 pp. 3–11, 23–25, 35–39.

*Primary Examiner*—Paul M. Dzierzynski
*Assistant Examiner*—John Juba, Jr.
*Attorney, Agent, or Firm*—James D. Welch

[57] ABSTRACT

A system for translating applied linear motion into a slit width present between facing edges of two "Knife-blade" elements. In its preferred embodiment, two slide assemblies are firmly affixed to a frame such that loci of motion of slide elements thereof form an acute angle therebetween. Lower ends of each slide element, as viewed in vertically oriented frontal elevation, allow horizontal motion therebetween when said slide element lower ends are caused to simultaneously move vertically. An alternative embodiment provides that the slide elements be oriented such that said loci of motion of said slide elements are, for instance, horizontally directed. In its preferred embodiment the simultaneous motion of the slide elements is effected by a motor, preferably a precisely controlled computer driven stepper motor, which motor causes a threaded shaft therein to move vertically as a result of screw thread translation of motor imparted rotational motion to said threaded shaft.

24 Claims, 2 Drawing Sheets

BILATERAL SLIT ASSEMBLY, AND METHOD OF USE

TECHNICAL FIELD

The present invention relates to systems for controlling the intensity and bandwidth of a beam of light allowed to pass therethrough. More particularly the present invention is a bilateral slit assembly in which a slit width present between the facing edges of two knife-blade elements is controlled by linearly translated motor, typically a computer driven stepper motor, effected rotational motion. The present invention finds application in Spectrometers, Monochrometers, and Spectrographs etc.

BACKGROUND

The operational requirement of, for instance, spectrometers, including both monochrometer and spectrograph systems, for light beams of controlled intensity and bandwidth is well known. Briefly, a spectrometer is any spectroscopic instrument whether it scans wavelengths individually, or entire spectra simultaneously and whether it employs a grating or a prism. A monochrometer is a spectrometer which images a single wavelength or wavelength band at a time, and a spectrograph is a spectrometer which images a range of wavelengths simultaneously.

Illumination of a slit, and the width thereof, determine the intensity and bandwidth, (within limits), of light which enters a spectrometer, monochrometer, spectrograph etc. with which it is associated, therethrough. As slit width increases, the intensity and bandwidth of light impinging thereon which pass therethrough both increase. As high light intensity and a small bandwidth are typically desirable, it will be appreciated that an optimum slit width will exist for any application. That is, a tradeoff is necessary. Precise control of a slit width is thus necessary.

A search of relevant materials has provided a general reference titled "Diffraction Grating Handbook", edited by Palmer, and published by Milton Roy Company in 1994. While not describing specific mechanisms for providing a slit width, the effects of slit width control are discussed therein.

In addition a Saito U.S. Pat. No. 4,316,661 describes a slit shutter system of the two blade type which employs electrically operated magnetic drive means arranged on opposite sides of respective rotatable transmission means. While the Saito system is directed at accomplishing a similar effect to that accomplished by the present invention, the mechanical linkage thereof is quite different, and is more complex than that of the present invention.

Other Patents of which the inventor is aware, but which are not considered to be particularly relevant are; U.S. Pat. No. 4,051,502 to Mielke, U.S. Pat. No. 4,320,950 to Senuma et al., and U.S. Pat. No. 4,122,461 to Morean et al.

There exists a need for an additional bilateral slit assembly slit width controlling system, which slit width controlling system is capable of precisely providing intended slit width, typically in conjunction with a computer driven stepper motor, and which slit width controlling system is simpler to construct and utilize than existing slit width controlling systems.

DISCLOSURE OF THE INVENTION

The present invention is a system for translating applied linear motion into a slit width present between facing edges of two "Knife-blade" elements.

In its preferred embodiment the present invention comprises two slide assemblies firmly affixed to a frame such that loci of motion of slide elements therein form an acute angle therebetween. It is to be understood that slide assemblies typically comprise an elongated rail element functionally combined with a slide element such that said slide element and elongated rail element can slide with respect to one another, in the direction of elongation. It is convenient to visualize said two slide assemblies in vertically oriented frontal elevation, affixed to said frame, wherein said loci of motion of said slide elements converge toward a lower extent of said frame thereby forming an upward opening "V" shape therebetween. As so visualized the lower ends of each slide element shall be understood to comprise means for allowing horizontal motion therebetween when said slide element lower ends are caused to simultaneously move vertically upward or downward. For instance, rollers allow such horizontal motion as they rest upon the upper surface of a horizontally oriented stage element which is caused to move vertically upward or downward. Spring elements can be present to force said rollers to "rest" upon the upper surface of said horizontally oriented stage where necessary. Additional slide assemblies can alternatively, be used in place of rollers. As well, collars slidably mounted to a horizontally oriented shaft circumscribed thereby might constitute a suitable means. In this case a vertical motion effecting attachment to said horizontally oriented shaft, midway between said slidably mounted circumscribing collars can be present, with said vertical motion effecting attachment comprising a circumscribing collar present around said horizontally oriented shaft.

The present invention further comprises two "knife-blade" elements one affixed to each slide element, such that a horizontal slit width between vertically oriented facing edges of said two knife-blade elements can be controlled from essentially zero (0) distance to some larger distance by a simultaneous upward vertically oriented motion of the lower ends of said slide elements, from an initial resting position.

An alternative embodiment provides that the slide elements and elongated rail elements present therewith both are oriented, for instance, in a horizontally oriented direction of elongation. In this embodiment springs serve to keep said horizontal slit width between vertically oriented facing edges of said two knife-blade elements at zero (0) until said vertically oriented knife-blade element facing edges are caused to separate by the forcing of a pointed separator element therebetween at an upper or lower aspect of said knife-blade vertically oriented facing edges. In this embodiment roller bearings might be present to effect a smooth contact to said pointed separator element.

The purpose of controlling said horizontal slit width between vertically oriented facing edges of said two knife-blade elements is to control the intensity and frequency bandwidth of a beam of light which can pass therebetween, as is required by spectrometers, monochrometers, spectrographs and the like.

In its preferred embodiment the simultaneous vertical motion of the lower ends of the slide elements is effected by a motor, preferably a precisely controlled computer driven stepper motor, which causes a threaded motor shaft therein to move vertically as a result of screw thread translation of motor imparted rotational motion to said threaded motor shaft. Said threaded motor shaft can be functionally interconnected to a horizontally oriented stage, a horizontally oriented shaft circumscribing collar with which the lower ends of said slide elements are functionally related, or to a pointed separator element, said elements being described above. It is to be understood that said motor is preferably firmly affixed to said frame so that the relative positioning between it and the slide assemblies is rigidly fixed during use.

The present invention also typically comprises an extension element, typically attached to the stage which, in use, serves to control access of a light beam detector to a beam of light produced by a light source (eg. emitting diode (LED)). Said extension element finds use in calibration of a present invention system. In use, a "home" position of the stage can be defined at the point where the extension element just allows a light source produced light beam to be transmitted to the light beam detector, by physically moving out from between said light source and light beam detector, as a function of computer driven stepper motor driven stage motion, to the extent that the light source produced beam of light is just able to travel from said light source to said light beam detector. It is also possible to define "home" position as that position where said extension element just.blocks a light source produced beam from being received by a light beam detector by moving between the light source and the light beam detector so as to block transmission. Said "home" position, it is to be understood, is associated with a slit width between the knife-blade facing elements.

Continuing, if a light beam is caused to pass through a slit width between knife-blade facing edges, a diffraction pattern can be made to appear on a wall at a distance from the location of said slit between knife-blade facing edges. Said wall is typically oriented so as to provide a plane surface parallel to the plane formed by the knife-blade elements. Said diffraction pattern on said wall allows calculation of the slit width between the knife-blade facing edges. Now, if a slit width is found at the "home" position, then a computer driven stepper motor specific number of computer directed steps are effected and cause said stage to move vertically, it should be appreciated that via above described system mechanics, a change the slit width between knife blade facing edges will be effected. Diffraction pattern analysis can again be utilized to determine the new slit width between knife blade facing edges. Knowing the number of computer driven stepper motor effected steps then allows one to calculate a calibration factor, (ego slit width change per computer driven stepper motor step).

For easy reference, the formula used to calculate a slit width is provided by classical physics and is:

$$\text{Slit Width} = \frac{(MN) \times (L)}{\text{Sin}(\text{Atan}(D/X))}$$

where:

MN is the number of Minima from the Diffraction Pattern Center Point used in the calculation;

L is the wavelength in Microns of the Light Beam utilized;

D is the distance in Microns from said Diffraction Pattern Center Point to the Minima Number used in the calculation;

X is the distance in Microns from the plane of the Knife Blade Elements to that of the Wall upon which the Diffraction Pattern is caused to appear; and Sin and Atan have their normal trigonometric significance.

The present invention will be better understood by reference to the Detailed Description Section of this Disclosure with reference being had to the accompanying Drawings.

SUMMARY OF THE INVENTION

The operational requirement of, for instance, spectrometers, including both monochrometer and spectrograph systems, for light beams of controlled intensity and bandwidth is well known.

Briefly, the illumination of a slit, and the width thereof, determine the intensity and bandwidth, (within limits), of light which enters a spectrometer, monochrometer, spectrograph etc. with which it is associated, therethrough.

The present invention is a system for translating applied linear motion into a slit width present between facing edges of two "Knife-blade" elements.

In its preferred embodiment the present invention comprises two elongated rail elements firmly affixed to a frame such that loci of motion between associated slide elements form an acute angle therebetween. It is convenient to visualize said two slide assemblies in frontal elevation, affixed to said frame, wherein slide element loci of motion converge toward a lower extent of said frame thereby forming an upward opening "V" shape therebetween. As so visualized the lower ends of each slide elements shall be understood to comprise means for allowing horizontal motion therebetween when said slide element lower ends are caused to simultaneously move vertically upward or downward.

The present invention further comprises two "knife-blade" elements, one affixed to each slide element, such that a horizontal slit width between vertically oriented facing edges of said two knife-blade elements can be controlled from essentially zero (0) distance to some larger distance by a simultaneous upward vertically oriented motion of the lower ends of said slide elements, from a resting position.

An alternative embodiment provides that the elongated rail elements be mounted to said frame, for instance, such that the direction of elongation is horizontally oriented. Vertically oriented knife-blade element facing edges are caused to separate by the forcing of a pointed separator element therebetween at an upper or lower aspect of said knife-blade vertically oriented facing edges, preferably via contact with roller bearings present at the lower extent of said knife-blade elements.

In its preferred embodiment the simultaneous motion of the slide elements is effected by a motor, preferably a precisely controlled computer driven stepper motor, which causes a threaded motor shaft therein to move vertically as a result of screw thread translation of motor imparted rotational motion to said threaded motor shaft. It is to be understood that said motor is preferably firmly affixed to said frame so that the relative positioning between it and the slide assemblies is rigidly fixed during use.

The preferred embodiment system also includes an extension element affixed thereto for use in controlling a light beam detector's access to a beam of light provided by a light beam transmitter during a calibration procedure.

It is therefore a purpose of the present invention to teach a new system for controlling a slit width between two facing edges of knife-blade elements, for use in spectrometers, monochrometers, spectrographs and the like.

It is a further purpose of the present invention to teach a method of use of the system thereof, including calibration thereof.

BRIEF DESCRIPTION OF THE DRAWINGS

FIG. 1b shows an end view of the preferred slide assembly of FIG. 1a.

DETAILED DESCRIPTION

Figure 1A:
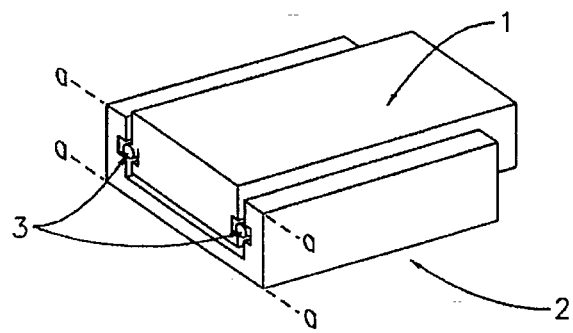
FIG. 1a shows a perspective view of a preferred slide assembly for use in the present invention.
Figure 1B:
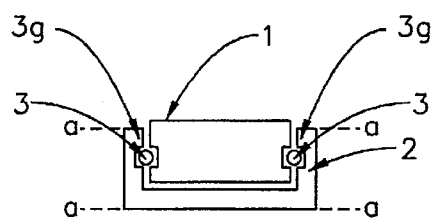

Turning now to the drawings, there is shown in FIG. 1(a) a perspective view of a preferred "slide assembly". Shown are a slide element (2), an elongated rail element (1) present therewith; and a ball bearing (3). Additional such ball bearings (3) are present along the length of the slide assembly and serve not only to provide for smooth sliding motion between said slide element (2) and elongated rail element (1) in the direction of elongation, but also serve as an "interlock" via the presence in grooves (3g) in each. FIG. 1(b) shows an end view taken at a—a in FIG. 1(a).

Figure 2A:
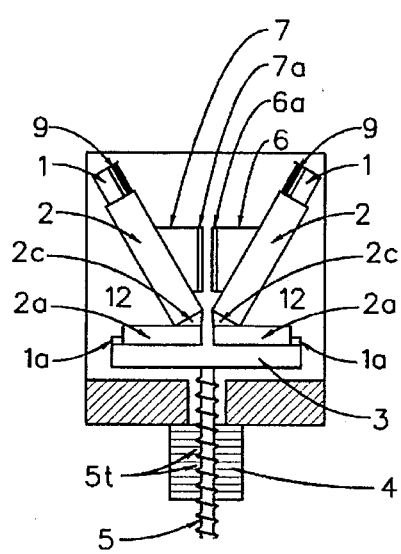
FIG. 2a shows a preferred embodiment of the present invention motor driven bilateral slit assembly.
Figure 2B:
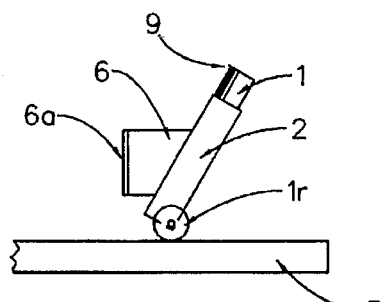
FIG. 2b shows alternative elements for use in the FIG. 2a preferred embodiment of the present invention motor driven bilateral slit assembly.
Figure 6:
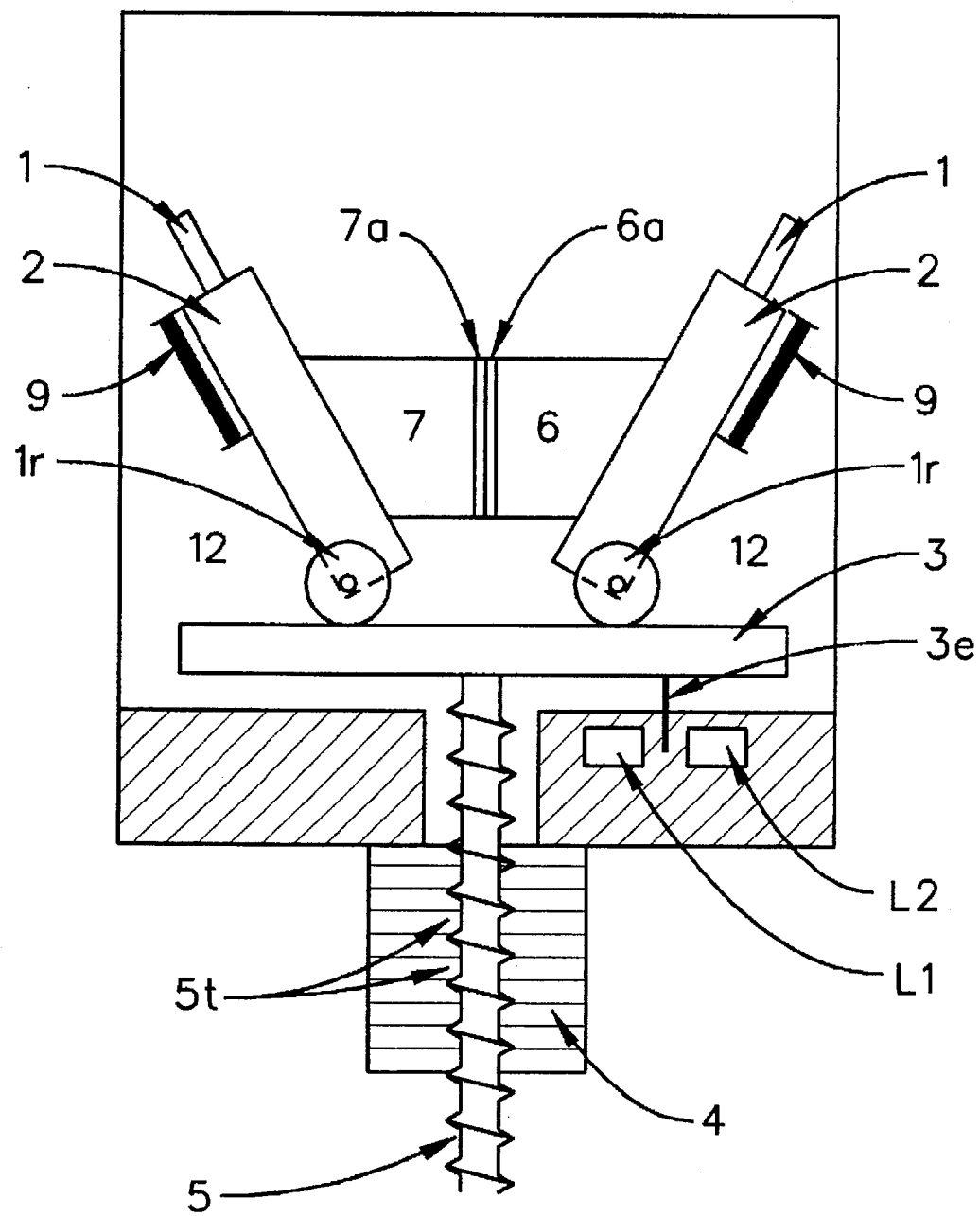
FIG. 6 shows an enlarged view of a preferred embodiment of the present invention system.

FIG. 2a shows a vertically oriented frontal elevational view of one embodiment of the present invention, motor driven, bilateral slit assembly showing two slide elements (2) with elongated rail elements (1) present therewith, which elongated rail elements (1) are firmly affixed to frame (12). Said slide elements (2) and elongated rail elements (1) are oriented so as to form a "V" shape therebetween, which opens upward, as viewed in FIG. 2(a). Affixed to slide elements (2) are knife-blade element (6) and (7) with facing edges thereon (6a) and (7a). The lower ends of said slide elements (2) are attached, via attachment means (2c), to additional slide elements (2(a)). In use threaded shaft (5) is caused to raise or lower stage (3) by linear translation of motor (4) imparted, preferably computer controlled rotational motion, via threads (5t), said threads (5t) being typically present in said motor (4). It is noted that said threads (5t) can alternatively be present in said frame (12). Said motor (4) is typically firmly affixed to said frame (12). The upper surface of said stage (3) has attached thereto additional elongated rail elements (1(a)). It should then be apparent that as said stage (3) is caused to raise or lower, said additional slide elements (2(a)) associated with said additional elongated rail elements (1(a)) can slide horizontally, thereby avoiding motion preventing binding. It should also be appreciated that vertical motion of said stage (3) causes the slit width between facing edges (6a) and (7a) of knife-blades (6) and (7) respectively to change. It is control of said slit width which is the purpose of a present invention system. Note also that compression springs (9) can be present to force the slide elements (2) downward. This might be important for instance, where rollers (1r), (see FIG. 2(b)), replace the additional slide elements (2a) and elongated rail elements (1(a)), which rollers (1r) simply rest atop said stage (3). It is mentioned that use of rollers (1r) as shown in FIG. 2(b) is a preferred practice as said rollers (1r) are relatively inexpensive. (FIG. 6 shows a preferred system embodiment of the present invention in which rollers (1r) are present in place of slide elements (2a)). As well, if grooves (3g) are not present in the slide elements (2) and elongated rail elements (1), as shown in FIGS. 1(a) and 1(b), so said elements are not "interlocked" by ball bearings (3), said slide elements (2) would require springs (9) to keep said slide elements (2) atop said elongated rail elements (1). Note that springs (9) as shown are compressed during use and serve to push roller (1r) against said stage (3) upper surface. It is to be understood that elongated springs (9) which serve to pull rollers (1r) down so that they rest atop the upper surface of stage (3) can also be used. (FIG. 6 shows such an elongated spring (6) arrangement).

Figure 3:
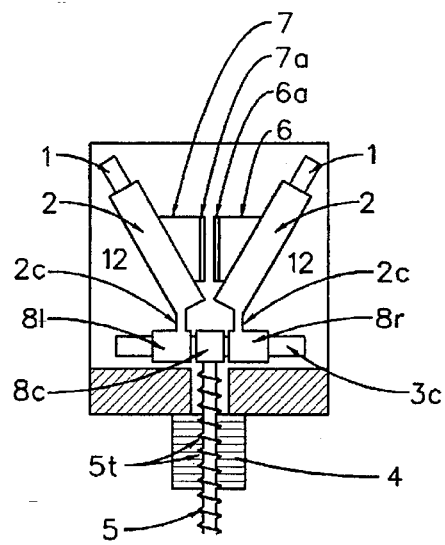
FIG. 3 shows an alternative embodiment of the present invention motor driven bilateral slit assembly.

FIG. 3 shows a modified embodiment of the present, motor controlled, bilateral slit assembly. The difference, as compared to the FIG. 2(a) embodiment, is found in replacement of the additional elongated rail elements (1a) affixed to the upper surface of said stage (3), and associated additional slide elements (2a), with a rod (3c) and collars (8r), (8l) and (8c), which collars (8r), (8l) and (8c), circumscribe said rod (3c). Said collars (8r) and (8l) being free to slide horizontally along said rod (3c) in use, where threads (5t) linearly translated motor (4) imparted rotational motion causes vertically oriented motion thereof, via collar (8c). It is noted that springs (9) are not present as said collars (8r), (8l) and (8c) circumscribe rod (3c) making it unnecessary to otherwise effect contact between the lower ends of slide elements (2) and, as in the FIG. 2(a) embodiment, the upper surface of a stage (3).

Figure 4:
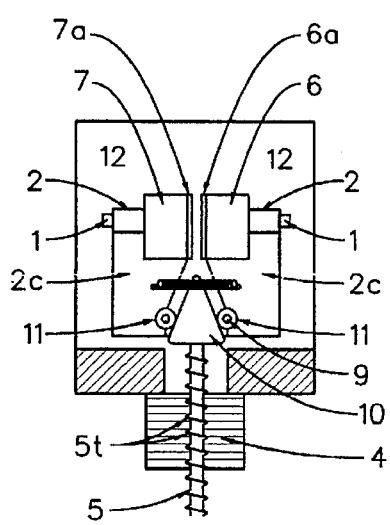
FIG. 4 shows another alternative embodiment of the present invention motor driven bilateral slit assembly.

FIG. 4 shows another embodiment of the present invention motor controlled bilateral slit assembly. In this embodiment the slide elements (2) and elongated rail elements (1) are oriented horizontally. Knife-blades (6) and (7) are affixed to said slide elements (2) as are attachment means (2c). To attachment means (2c) are typically affixed roller bearings (11), such that during use pointed separator element (10) contacts said roller bearings (11) and by linear translation of motor (4) imparted, preferably computer controlled, rotational motion, via threads (5t) causes separation of the facing edges (6a) and (7a) of said knife-blades (6) and (7). Spring (9) serves to force said facing edges (6a) and (7a) of knife-blades (6) and (7) respectively, together when pointed separator element (10) is lowered sufficiently to so allow. Other elements in FIG. 4 are similar to those in FIGS. 1(a) and 3.

It is to be understood that in the forgoing, it was the slide elements (2) which were identified as free to move, and the elongated rail elements (1) which were considered as affixed to frame (12). The functional roles played by said elements can, of course, be reversed. The relative functional sliding action between said elements is the focus. Any functional equivalents of any of the herein described elements of the present invention are to be considered within the scope of the present invention.

Also, for descriptive convenience, the system of the present invention was described viewed in vertically oriented frontal elevation. It is possible to use the present invention oriented other than in vertically oriented frontal elevation.

Figure 5:
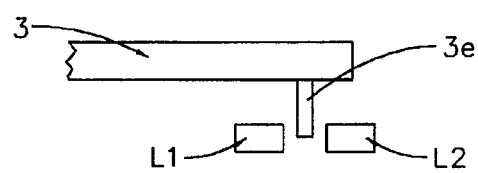
FIG. 5 shows an extension element in conjunction with an (LED) and light beam detector for use in calibration of the present invention bilateral slit assembly.

The present invention typically includes an extension element, affixed to the stage (3), of for instance, the embodiments shown in FIGS. 2(a), 2(b) and 6. FIG. 5 shows the extension element (3e), projecting from stage (3) between, for instance, a Light Beam Transmitter (L1), (eg. a Light Emitting Diode LED)), and a Light Beam Detector (L2). Use of said extension element and in a calibration procedure was described in the Disclosure of the Invention Section of this Disclosure and will not be repeated here. It will be appreciated, however, that movement of the stage (3) will effect movement of the extension element (3e) between light beam transmitter (L1) and light beam detector (L2) so that a beam of light originating in light beam transmitter (L1) will at some point of movement of extension element (3e) block transmission to light beam detector (L2), thereby identifying what was described in the Disclosure of the Invention Section as "home" position. Similar extension elements can be affixed to the embodiment shown in FIG. 4 attachment means (2c) or a knife-blade (6).

Finally, for easy viewing, FIG. 6 shows an expanded view of a preferred embodiment of system of the present invention. The numerical identifiers are the same as used in the forgoing discussion. Rail elements (1) are affixed to frame (12) and slide elements (2) are associated with each rail element (1). Knife-blades (6) and (7) with facing edges (6a) and (7a) are affixed to said slide elements (2) as are rollers (1r). Rollers (1r) rest upon stage (3) and are held in contact therewith by elongated springs (9). Threaded shaft (5) is present in computer driven stepper motor (4) and serves to provide vertically oriented linear motion to said stage (3) in use via thread (5t) translated rotational shaft (5) motion. Also shown are extension element (3e), light beam transmitter (L1) and light beam detector (L2).

Having hereby disclosed the subject matter of the present invention, it should be obvious that many modifications, substitutions, and variations of the present invention are possible in light of the teachings. It is therefore to be understood that the invention may by practiced other than as specifically described, and should be limited in breadth and scope only by the claims.

I claim:

1. A bilateral slit assembly comprising two slide assemblies, each slide assembly comprising an elongated rail element and a slide element for sliding with respect to said elongated rail element in the direction of elongation thereof, said elongated rail elements being affixed to a frame such that sliding motion loci of said slide elements converge toward a lower extent of said frame, as said sliding motion loci of said slide elements are viewed within said bilateral slit assembly, when said bilateral slit assembly is viewed in vertically oriented frontal elevation, said slide elements thereby forming an upward opening "V" shape therebetween; a lower end of each said slide element comprising means for allowing horizontal motion between said slide element lower ends when said slide element lower ends are caused to simultaneously move vertically during use, which bilateral slit assembly further comprises two knife-blade elements, one affixed to each slide element such that a horizontal slit width between vertically oriented facing edges of said two knife-blade elements can be controlled between essentially zero (0) distance and some larger distance by a simultaneous vertically oriented motion of the lower ends of said slide elements during use, such that controlling said horizontal slit width between vertically oriented facing edges of said two knife-blade elements controls the intensity and frequency bandwidth of a light beam which can pass therebetween.

2. A bilateral slit assembly as in claim 1 in which rollers comprise the means for allowing horizontal motion between the lower ends of said slide elements, which rollers rest upon a horizontally oriented stage element which is caused to move vertically during use.

3. A bilateral slit assembly as in claim 2 in which spring means are present to force said rollers to rest upon said horizontally oriented stage.

4. A bilateral slit assembly as in claim 1 in which additional slide assemblies comprise the means to allow said horizontal motion between the lower ends of said slide elements, elongated rail elements of said additional slide assemblies being affixed to a horizontally oriented stage element which is caused to move vertically during use.

5. A bilateral slit assembly as in claim 1 in which collars slidably mounted to a horizontally oriented rod comprise the means to allow said horizontal motion between the lower ends of said slide elements when said horizontally oriented rod is caused to move vertically during use.

6. A bilateral slit assembly as in claim 1 which further comprises means for causing the simultaneous motion of said lower ends of said slide elements during use.

7. A bilateral slit assembly as in claim 6 in which said means for causing the simultaneous motion of said slide elements during use is a precisely controlled computer driven stepper motor which causes a threaded motor shaft therein to move vertically as a result of screw thread translation of motor imparted rotational motion to said threaded motor shaft, said vertical motion causing said slide elements to simultaneously move vertically during use, said precisely controlled computer driven stepper motor being firmly affixed to said frame so that the relative positioning between said stepper motor and the slide assemblies is rigidly fixed during use.

8. A bilateral slit assembly comprising two slide assemblies, each slide assembly comprising an elongated rail element and a slide element for sliding with respect to said elongated rail element in the direction of elongation thereof, said elongated rail elements being firmly affixed to a frame and oriented such that sliding motion loci of said slide elements are both horizontally oriented as viewed in said bilateral slit assembly when said bilateral slit assembly is viewed in vertically oriented frontal elevation, which bilateral slit assembly further comprises two knife-blade elements, one affixed to each slide element such that a horizontal slit width between vertically oriented facing edges of said two knife-blade elements can be controlled between essentially zero (0) distance and some larger distance by a pointed separator element, which in use is caused to be forced between said knife-blade elements vertically oriented facing edges, which bilateral slit assembly further comprises roller bearings associated with each knife-blade element, with which roller bearings said pointed separator element make contact when forced between said knife-blade elements vertically oriented facing edges during use, such that controlling said horizontal slit width between vertically oriented facing edges of said two knife-blade elements controls the intensity and frequency bandwidth of a light beam which can pass therebetween.

9. A bilateral slit assembly as in claim 8 which further comprises spring means for effecting zero (0) horizontal distance between the vertically oriented facing edges of said two knife-blade elements, and means for causing the forcing of said pointed separator element between said knife-blade elements vertically oriented facing edges during use to increase said horizontal distance between the vertically oriented facing edges of said two knife-blade elements.

10. A bilateral slit assembly as in claim 9 in which said means for causing the forcing of said pointed separator element between said knife-blade elements vertically oriented facing edges during use is a precisely controlled computer driven stepper motor, which causes a threaded motor shaft therein to move vertically as a result of screw thread translation of motor imparted rotational motion to said threaded motor shaft, said vertical motion forcing said pointed separator element between said vertically oriented knife-blade element facing edges, said precisely controlled computer driven stepper motor being firmly affixed to said frame so that the relative positioning between said stepper motor and the slide assemblies is rigidly fixed during use.

11. A bilateral slit assembly as in claim 8 which further comprises an extension element functionally affixed to a slide element such that when said slide element is caused to move in use, said extension element moves therewith, said bilateral slit assembly also further comprising a light transmitting element and a light detector element, said extension element being oriented so as to project between said light transmitting element and said light detector element, such that movement of said slide element during use causes said extension element to move, so that at some point it just blocks transmission of light from said light transmitting element to said light detector element, said point being identified as a "home" position.

12. A bilateral slit assembly comprising two slide assemblies, each slide assembly comprising an elongated rail element and a slide element for sliding respect to said elongated rail element in the direction of elongation thereof, said elongated rail elements being affixed to a frame such that sliding motion loci of said slide elements converge toward a lower extent of said frame, as said sliding motion loci of said slide elements are viewed within said bilateral slit assembly, when said bilateral slit assembly is viewed in vertically oriented frontal elevation, said slide elements thereby forming an upward opening "V" shape therebetween; a lower end of each said slide element comprising means for allowing horizontal motion between said slide element lower ends when said slide element lower ends are caused to simultaneously move vertically, which bilateral slit assembly further comprises two knife-blade elements, one affixed to each slide element such that a horizontal slit width between vertically oriented facing edges of said two knife-blade elements can be controlled between essentially zero (0) distance and some larger distance by a simultaneous vertically oriented motion of the lower ends of said slide elements, which bilateral slit assembly further comprises a precisely controlled computer driven stepper motor which causes a threaded motor shaft therein to move vertically as a result of screw thread translation of motor imparted rotational motion to said threaded motor shaft, said vertical motion forcing said slide elements to move vertically during use, said precisely controlled computer driven stepper motor being firmly affixed to said frame so that the relative positioning between said stepper motor and the slide assemblies is rigidly fixed during use, such that controlling said horizontal slit width between vertically oriented facing edges of said two knife-blade elements controls the intensity and frequency bandwidth of a light beam which can pass therebetween.

13. A bilateral slit assembly as in claim 12 in which rollers comprise the means for allowing horizontal motion between the lower ends of said slide elements, which rollers rest upon a horizontally oriented stage element which is caused to move vertically during use.

14. A bilateral slit assembly as in claim 13 in which spring means are present to force said rollers to rest upon said horizontally oriented stage.

15. A bilateral slit assembly as in claim 12 in which additional slide assemblies comprise the means to allow said horizontal motion between the lower ends of said slide elements, elongated rail elements of said additional slide assemblies being affixed to a horizontally oriented stage element which is caused to move vertically during use.

16. A bilateral slit assembly as in claim 12 in which collars slidably mounted to a horizontally oriented rod comprise the means to allow said horizontal motion between the lower ends of said slide elements when said horizontally oriented rod is caused to move vertically during use.

17. A bilateral slit assembly as in claim 12 which further comprises an extension element affixed to a bilateral slit assembly stage element upon which the lower extents of said slide elements rest, which bilateral slit assembly further comprises a light transmitting element and a light detector element, said extension element being oriented so as to project between said light transmitting element and said light detector element, such that movement of said bilateral slit assembly stage element during use causes said slide elements, as well as said extension element to move, so that at some point said extension element just blocks transmission of light from said light transmitting element to said light detector element, said point being identified as a "home" position.

18. A bilateral slit assembly comprising two slide assemblies, each slide assembly comprising an elongated rail element and a slide element for sliding with respect to said elongated rail element in the direction of elongation thereof, said elongated rail elements being firmly affixed to a frame and oriented such that sliding motion loci of said slide elements are both horizontally oriented as viewed in said bilateral slit assembly when said bilateral slit assembly is viewed in vertically oriented frontal elevation, which bilateral slit assembly further comprises two knife-blade elements, one affixed to each slide element such that a horizontal slit width between vertically oriented facing edges of said two knife-blade elements can be controlled between essentially zero (0) distance and some larger distance by the forcing of a pointed separator element between said knife-blade elements vertically oriented facing edges during use, which bilateral slit assembly further comprises means for causing the forcing of said pointed separator element between said knife-blade elements vertically oriented facing edges during use, said means being a precisely controlled computer driven stepper motor, which causes a threaded motor shaft therein to move vertically as a result of screw thread translation of motor imparted rotational motion to said threaded motor shaft, said vertical motion forcing said pointed separator element between said vertically oriented knife-blade elements facing edges, said precisely controlled computer driven stepper motor being firmly affixed to said frame so that the relative positioning between said stepper motor and the slide assemblies is rigidly fixed during use, such that controlling said horizontal slit width between vertically oriented facing edges of said two knife-blade elements controls the intensity and frequency bandwidth of a light beam which can pass therebetween.

19. A method of controlling a horizontal slit width between vertically oriented facing edges of said two knife-blade elements to control the intensity and frequency bandwidth of a light beam which can pass therebetween, as is required by spectrometers, monochrometers, and spectrographs and the like, comprising the steps of:

a. providing a bilateral slit assembly comprising two slide assemblies, each slide assembly comprising an elongated rail element and a slide element for sliding with respect to said elongated rail element in the direction of elongation thereof, wherein said two slide assemblies are oriented, by affixing said elongated rail elements to a frame, such that sliding motion loci of said slide elements converge toward a lower extent of said frame, as said sliding motion loci of said slide elements are viewed within said bilateral slit assembly, when said bilateral slit assembly is viewed in vertically oriented frontal elevation, said slide elements thereby forming an upward opening "V" shape therebetween; a lower end of each said slide element comprising means for allowing horizontal motion between said slide element lower ends when said slide element lower ends are caused to simultaneously move vertically, each of which means for allowing horizontal motion contacts a bilateral slit assembly stage, which bilateral slit assembly further comprises two knife-blade elements, one affixed to each slide element such that a horizontal slit width between vertically oriented facing edges of said two knife-blade elements can be controlled between essentially zero (0) distance and some larger distance by a simultaneous vertically oriented motion of the lower ends of said slide elements, which bilateral slit assembly further comprises a precisely controlled computer driven stepper motor which causes a threaded motor shaft therein to move vertically as a result of screw thread translation of motor imparted rotational motion to said threaded motor shaft, said vertical motion forcing said bilateral slit assembly stage and slide elements, which rest upon said bilateral slit assembly stage, to move vertically during use, said precisely controlled computer driven stepper motor being firmly affixed to said frame so that the relative positioning between said stepper motor and the slide assemblies is rigidly fixed during use;

b. causing said computer driven stepper motor to operate such that the lower ends of said slide elements are simultaneously caused to move in a vertically oriented direction.

20. A method of controlling a horizontal slit width between vertically oriented facing edges of said two knife-blade elements, as in claim 19 which further comprises the step of orienting the bilateral slit assembly in other than vertically oriented frontal elevation during use.

21. A method of controlling a horizontal slit width between vertically oriented facing edges of said two knife-blade elements, as in claim 19 which further comprises the steps of:

a. affixing an extension element to said bilateral slit assembly stage, said extension element being oriented so as to project between a light transmitting element and a light detector element, such that movement of said bilateral slit assembly stage during use causes said extension element to move, so that at some point it just blocks transmission of light from said light transmitting element to said light detector element, said point being identified as a "home" position, which "home" position is used in a calibration procedure comprising:

b. determining the slit width between facing edges of said knife-blade elements when the bilateral slit assembly is in the "home" position, utilizing conventional diffraction pattern analysis of a diffraction pattern effected by transmitting a light beam through said slit width between facing edges of said knife-blade elements;

c. causing said computer driven stepper motor to effect some known number of steps;

d. again determining the slit width between facing edges of said knife-blade elements utilizing conventional diffraction pattern analysis of a diffraction pattern effected by transmitting a light beam through said slit width between facing edges of said knife-blade elements; and e. dividing the change in slit width between that found in step b. and that found in step d, by the number of steps effected by the computer driven stepper motor in step c. to provide a slit width change per stepper motor step.

22. A method of controlling a horizontal slit width between vertically oriented facing edges of said two knife-blade elements to control the intensity and frequency bandwidth of a light beam which can pass therebetween, as is required by spectrometers, monochrometers, and spectrographs and the like, comprising the steps of:

a. providing a bilateral slit assembly comprising two slide assemblies, each slide assembly comprising an elongated rail element and a slide element for sliding with respect to said elongated rail element in the direction of elongation thereof, said elongated rail elements being firmly affixed to a frame and oriented such that sliding motion loci of said slide elements are both horizontally oriented as viewed in said bilateral slit assembly when said bilateral slit assembly is viewed in vertically oriented frontal elevation, which bilateral slit assembly further comprises two knife-blade elements, one affixed to each slide element such that a horizontal slit width between vertically oriented facing edges of said two knife-blade elements can be controlled between essentially zero (0) distance and some larger distance, wherein spring means serve to keep said horizontal slit width between said vertically oriented facing edges of said two knife-blade elements at zero (0) until said vertically oriented knife-blade elements facing edges are caused to separate by the forcing of a pointed separator element between said knife-blade vertically oriented facing edges during use, which bilateral slit assembly further comprises means for causing the forcing of a pointed separator element between said knife-blade elements vertically oriented facing edges during use, said means comprising a precisely controlled computer driven stepper motor which causes a threaded motor shaft therein to move vertically as a result of screw thread translation of motor imparted rotational motion to said threaded motor shaft, said vertical motion forcing said pointed separator element between said vertically oriented knife-blade elements facing edges, said precisely controlled computer driven stepper motor being firmly affixed to said frame so that the relative positioning between said stepper motor and the slide assemblies is rigidly fixed during use, b. causing the computer driven motor to operate such that the pointed separator element is forced to move in a vertically oriented direction between said knife-blade elements vertically oriented facing edges, thereby changing the horizontal slit width therebetween.

23. A method of controlling a horizontal slit width between vertically oriented facing edges of said two knife-blade elements, as in claim 22 which further comprises the step of orienting the bilateral slit assembly in other than vertically oriented frontal elevation during use.

24. A method of controlling a horizontal slit width between vertically oriented facing edges of said two knife-blade elements, as in claim 18 which further comprises the steps of:

a. functionally affixing an extension element to a bilateral slit assembly slide element, such that when said slide element is caused to move in use, said extension element moves therewith, said extension element being oriented so as to project between a light transmitting element and a light detector element, such that movement of said slide element during use causes said extension element to move, so that at some point it just blocks transmission of light from said light transmitting element to said light detector element, said point being identified as a "home" position, which "home" position is used in a calibration procedure comprising:

b. determining the slit width between facing edges of said knife-blade elements when the bilateral slit assembly is in the "home" position, utilizing conventional diffraction pattern analysis of a diffraction pattern effected by transmitting a light beam through said slit width between facing edges of said knife-blade elements;

c. causing said computer driven stepper motor to effect some known number of steps;

d. again determining the slit width between facing edges of said knife-blade elements utilizing conventional diffraction pattern analysis of a diffraction pattern effected by transmitting a light beam through said slit width between facing edges of said knife-blade elements; and e. dividing the change in slit width between that found in step b. and that found in step d. by the number of steps effected by the computer driven stepper motor in step c. to provide a slit width change per stepper motor step.

* * * * *